US012632855B2

(12) United States Patent
Garani et al.

(10) Patent No.: US 12,632,855 B2
(45) Date of Patent: May 19, 2026

(54) SYSTEM AND METHOD FOR SECURE AND CONTACTLESS FUND TRANSFER IN OPEN AND CLOSED LOOP TRANSACTIONS

(71) Applicant: Jio Platforms Limited, Ahmedabad (IN)

(72) Inventors: Pradeep Garani, Karnataka (IN); Nimish Jain, Karnataka (IN); Sunitha Kambham, Karnataka (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 95 days.

(21) Appl. No.: 17/708,800

(22) Filed: Mar. 30, 2022

(65) Prior Publication Data

US 2022/0318797 A1 Oct. 6, 2022

(30) Foreign Application Priority Data

Mar. 31, 2021 (IN) ............................. 202121014781

(51) Int. Cl.
| | |
|---|---|
| *G06Q 20/38* | (2012.01) |
| *G06Q 20/02* | (2012.01) |
| *G06Q 20/34* | (2012.01) |
| *H04L 9/08* | (2006.01) |
| *G06F 16/2457* | (2019.01) |

(52) U.S. Cl.
CPC ....... *G06Q 20/3829* (2013.01); *G06Q 20/027* (2013.01); *G06Q 20/352* (2013.01); *G06Q 20/387* (2013.01); *H04L 9/0825* (2013.01)

(58) Field of Classification Search
CPC ............. G06Q 20/3829; G06Q 20/027; G06Q 20/352; G06Q 20/387; G06F 16/2457; H04L 9/0825
See application file for complete search history.

(56) References Cited

U.S. PATENT DOCUMENTS

| | | | | |
|---|---|---|---|---|
| 2012/0278869 | A1* | 11/2012 | Guccione ................ | H04L 67/55 726/5 |
| 2014/0013406 | A1* | 1/2014 | Tremlet ................... | G09C 1/00 726/5 |
| 2015/0142670 | A1* | 5/2015 | Zloth .................. | G06Q 20/3829 705/71 |
| 2016/0212125 | A1* | 7/2016 | Pender ................ | H04L 63/0861 |

(Continued)

*Primary Examiner* — Patrick McAtee
*Assistant Examiner* — Zesheng Xiao
(74) *Attorney, Agent, or Firm* — FINNEGAN, HENDERSON, FARABOW, GARRETT & DUNNER, LLP

(57) ABSTRACT

The present invention relates to a system for transfer of fund from a user to an entity. The user may be associated with a user computing device and the entity may be associated with an entity device. The entity device may include a secure element embedded within the entity device such that the secure element may enable short range communication with the user computing device or physical card for a secure and contactless fund transfer. The system may include a simple and convenient mode of the contactless fund transfer such as, for example, a tap-to-x transaction model, tap-to-pay for fund transfer, and tap-to-go for transit/access. Each operation pertaining to the fund transfer may be processed through the entity device that ultimately connects to a service provider. The secure element enables the fund transfer to be secure, authentic and confidential.

19 Claims, 12 Drawing Sheets

(56) References Cited

U.S. PATENT DOCUMENTS

| | | | |
|---|---|---|---|
| 2016/0275508 A1* | 9/2016 | Buchholtz | G06Q 20/325 |
| 2017/0206516 A1* | 7/2017 | Watson | G06Q 20/3274 |
| 2018/0181961 A1* | 6/2018 | Nair | G06Q 20/20 |
| 2018/0367311 A1* | 12/2018 | Stahlberg | H04L 63/101 |

* cited by examiner

200

SYSTEM AND METHOD FOR SECURE AND CONTACTLESS FUND TRANSFER IN OPEN AND CLOSED LOOP TRANSACTIONS

RESERVATION OF RIGHTS

FIELD OF INVENTION

The embodiments of the present disclosure generally relate to fund transfer. More particularly, the present disclosure relates to a secure and contactless fund transfer using short range communication.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

In the last few decades, there has been a rising trend in the concept of point-of-sale (POS) applications that have extended to all forms of physical shopping. Although POS devices facilitates convenient alternatives to cash payment such as payment through use of a debit card or credit card. The use of such cards greatly save the concern of carrying cash at all times. However, the POS implementations tend to be complex due to which the usage of such POS set-up may incur high costs. Also, the conventional systems may require swiping of cards that may be tedious if the card is damaged or the device is unable to read the same. Further, there may be a situation wherein such devices can be limited to only certain type of transactions such as either open loop or closed loop fund transfer, thus limiting the usage of conventional POS devices.

There is therefore a need in the art to provide a system and a method that can conduct contactless fund transfer and at the same time can be efficient, secure (Transaction Integrity, Authenticity and Confidentiality), faster, cost-effective and reliable.

OBJECTS OF THE PRESENT DISCLOSURE

Some of the objects of the present disclosure, which at least one embodiment herein satisfies are as listed herein below.

It is an object of the present disclosure to provide a system and a method for performing secure, reliable and contactless fund transfer.

It is an object of the present disclosure to provide a system and a method for reducing the costs of complex physical implementation involved in conventional systems.

It is an object of the present disclosure to provide a system and a method for performing offline fund transfer.

It is an object of the present disclosure to provide a system and a method for performing secure and contactless fund transfer in open loop systems and closed loop systems.

SUMMARY

This section is provided to introduce certain objects and aspects of the present invention in a simplified form that are further described below in the detailed description. This summary is not intended to identify the key features or the scope of the claimed subject matter.

In order to achieve the aforementioned objectives, the present invention provides a system and method for managing e-transactions from a user to an entity by facilitating a unique communication channel between a user computing device and an entity device. The system may include one or more processors coupled with a memory. The processors may further include a secure element embedded within the entity device such that the secure element enables a short range communication with the user computing device, wherein the memory stores instructions which when executed by the one or more processors causes the system to: receive, by the secure element at the entity device, a set of data packets pertaining to one or more services to be availed by the user and verify, by the secure element, authenticity of the user. Upon establishing authenticity, the secure element may initiate a communication channel to generate a secure and confidential transaction module between the secure element and the user computing device; and transfer with the help of the transaction module, funds with respect to the one or more services, the funds being transferred from the user computing device to the secure element embedded in the entity device.

In another aspect, the present disclosure includes method for the system for managing e-transactions from a user to an entity by facilitating a unique communication channel between a user computing device and an entity device. The method may be executed by a processor, and includes the steps of: receiving, by a secure element embedded within the entity device, a set of data packets pertaining to one or more services to be availed by the user. The secure element may enable a short-range communication with the user computing device. The method may further include verifying, by the secure element, authenticity of the user. Upon establishing authenticity, the method may include the step of initiating, by the secure element, a communication channel to generate a secure and confidential transaction module between the secure element and the user computing device; and the step of transferring with the help of the transaction module, funds with respect to the one or more services, the funds being transferred from the user computing device to the secure element embedded within the entity device.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

Figure 1:
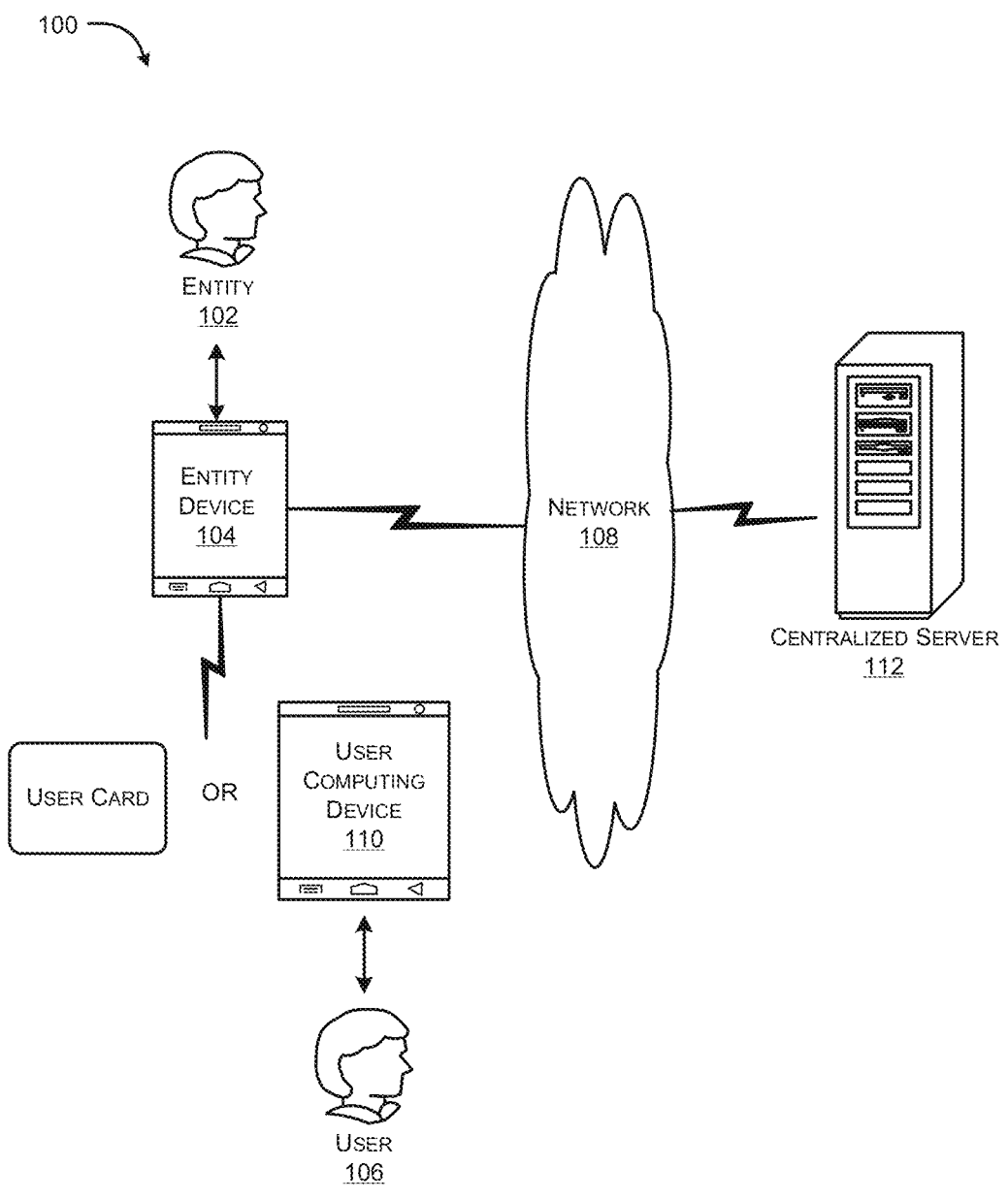
FIG. 1 illustrates an exemplary network architecture (100) in which or with which the system of the present disclosure can be implemented, in accordance with an embodiment of the present disclosure.

The foregoing shall be more apparent from the following more detailed description of the invention.

BRIEF DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention provides a system and a method for a secure and contactless fund transfer using short range communication. The present invention relates to use of contactless technology for mobile fund transfer that can operate on any or a combination of an open loop system and a closed loop system. The system of the present invention comprises an entity device, which may be a portable device capable of communication over short range communication with user devices/physical cards to enable fund transfer from the user to the entity in a cost-effective and contactless manner, unlike the conventional point-of-sale (POS) systems. Thus, the system and method of the present disclosure can enable an entity or fund recipient to operate without complicated devices, and in a faster, consistent and reliable operation that does not require bulky/expensive POS implementations and/or physical reading of cards and hence is devoid of the disadvantages associated thereto.

Referring to FIG. 1 that illustrates an exemplary network architecture in which or with which system (100) of the present disclosure can be implemented, in accordance with an embodiment of the present disclosure. As illustrated, the exemplary architecture includes a system (100) for transfer of fund from a user (106) to an entity (102). The user may be associated with a user computing device (110) and the entity (102) may be associated with an entity device (104). The system (100) may allow a secure and contactless fund transfer from the user computing device (110) to the entity device (104). In an embodiment, the entity device (104) may communicate with the user computing device (110) and/or a physical user card (through a short-range communication).

The system may further include one or more processors (204) coupled with a memory, the processors including a secure element embedded within the entity device (104) such that the secure element may enable a short-range communication with the user computing device (110). The memory stores instructions which when executed by the one or more processors may cause the system (100) to: receive, by the secure element at the entity device (104), a set of data packets pertaining to one or more services to be availed by the user (106). The secure element may then verify authenticity of the user (106). Upon establishing authenticity, the secure element may then establish or initiate a communication channel to generate a secure and confidential transaction module between the secure element and the user computing device. The system (100) will then transfer funds with respect to the one or more services with the help of the transaction module, the funds being transferred from the user computing device (110) to the secure element embedded in the entity device (104). The user computing device can include but not limited to a point-of-sale (POS) terminal. The POS terminal is a hardware system for processing card payments at retail locations and may include software applications to read magnetic strips of credit and debit cards embedded in the hardware.

In an embodiment, the short range communication may include, without limitation, Near Field Communication (NFC), radio-frequency identification technology (RFID), Bluetooth™ and other short range communication modes. In an exemplary embodiment, the short range communication may include Near Field Communication (NFC). Various other communication mode may also be used. In an embodiment, the short range communication may be effective over a predetermined physical distance between the entity device (104) and the user computing device (110) in the range of 1 cm to 10 cm. In an exemplary embodiment, the physical distance may be approximately 4 cm. In an exemplary embodiment, the short-range communication may include NFC standards cover communications protocols and data exchange formats and Anti-collision mechanism and may be based on radio-frequency identification (RFID) standards ISO/IEC 14443.

The entity device may be communicably coupled to a centralized server (112) through a network (108). The system (100) enables digital engagement pertaining to one or more operations of fund transfer. The system (100) may include a simple and convenient mode of fund transfer including, but not limited to, a tap-to-x transaction model, tap-to-pay for fund transfer, and tap-to-go for transit/access of any or a combination of the user card or tokenised card on the user computing device. Various other modes of transfer or communication may be used. In an embodiment, each operation pertaining to the fund transfer may be processed through a contactless exchange with the entity device that ultimately connects to the service provider. The secure element enables the fund transfer to be secure, authentic and confidential.

In an embodiment, the system may be configured to obtain a registration data based on a request from an unregistered user through respective user computing device, wherein login credentials are generated based on acknowledgement of the request and verification of the registration data, wherein the user enters the generated login credentials to access the system to obtain the one or more services provided by the entity. The secure element may be configured to extract a first set of features from the received set of data packets, wherein the user authentication is processed based on mapping and authentication of the extracted first set of features with a knowledgeable database having the user information and registration details.

In an embodiment, the system (100) may be used for at least one operation pertaining to fund transfer involving contactless use of credit card, a debit card, and other such cards. In another embodiment, the system (100) may also be used for at least one operation pertaining to transfer or access of one or more coupons including, but not limited to, a transit coupon/card, a gift/loyalty coupon/card and other such coupons. In another embodiment, the system (100) may also be used for at least one operation pertaining to transfer or access of one or more fund instruments including, but not limited to, a digital fund wallet and other such instruments.

In an embodiment, the entity may be any individual, group of individuals or an organization that may offer one or more products or services such that a fund may be transferred by a user to the entity for the products and/or services. In an exemplary embodiment, the entity may be a shop owner or a company or a service professional/entity providing service and/or products related, without limitation, to groceries, consumer products, apparel, electronic equipment, footwear, furniture, interior decoration, construction services, educational services, financial services, legal services, administrative services, beauty services, shopping items, cosmetics, entertainment, health services, gift products and any other provider of products/services. Various other products and/or services may be included. The user (106) may be recipient of any or a combination of above mentioned products and/or services, pertaining to which the fund transfer may be performed such that the fund may be received by the entity (102) in exchange of the products and/or services. In an exemplary embodiment, the entity (102) may be a kirana merchant owning the entity device (104) with an embedded secure element (eSE) for accepting funds. Using the system of the present invention, the entity (102) may be able to avoid conventional expensive PoS systems thus allowing cost-effective alternative to receive the fund from the user (106) in exchange of a service and/or a product. The system may facilitate secured fund transfer. The fund transfer may occur via exchange of data packets through a network and/or without a network (offline). In an embodiment, the fund transfer may be open loop and/or closed loop based transfer, wherein the fund transfer may be facilitated in a secure manner by encryption process. In an exemplary embodiment, open loop and/or closed loop transaction standards may be defined/supported by standard modes such as Europay, Mastercard, and Visa (EMVCo), MIFARE™ DESFire standards (defined by MiFARE) and other known standards.

In an embodiment, a Hardware Security Module (HSM) coupled to the secure element is configured to: onboard a secure cryptographic key generation for the fund transaction; onboard storage for the secure cryptographic key, at least for a top level and most sensitive keys; manage the secure cryptographic key; use the secure cryptographic key, for performing encryption or digital signature functions; offload one or more servers for complete asymmetric and symmetric cryptography; and secure a knowledgebase from any logical or physical attacks.

In an embodiment, the set of data packets may be updated in the secure element every time a new user tries to establish communication with the entity.

In accordance with an embodiment and as illustrated in FIG. 1, the architecture can enable the entity (102) to establish the short-range communication through a set of instructions on the entity device (104). The entity device (104) may be a portable device with an embedded secure element and other physical/electronic implementation for acting as a portable point-of-sale device without the need to swipe cards. In an embodiment, within a predefined short-range distance, the short range communication may be active between the user computing device (110) and the entity device (104) such that the entity (102) or the user (106) may initiate a fund transfer or request a fund transfer using respective entity device (104) and computing device (110) via set of instructions residing on any operating system, including but not limited to, Android™, iOS™, and the like. In an embodiment, user computing device (110) may include, but not limited to, any electrical, electronic, electro-mechanical or an equipment or a combination of one or more of the above devices such as mobile phone, smartphone, virtual reality (VR) devices, augmented reality (AR) devices, pager, laptop, a general-purpose computer, desktop, personal digital assistant, tablet computer, mainframe computer, or any other computing device. The entity device (104) and/or the user computing device (110) may include one or more in-built or externally coupled accessories including, but not limited to, a visual aid device such as camera, audio aid, a microphone, a keyboard, input devices for receiving input from a user such as touch pad, touch enabled screen, electronic pen and the like. It may be appreciated that the entity device (104) and or user computing device (110) may not be restricted to the mentioned devices and various other devices may be used.

Figure 2:
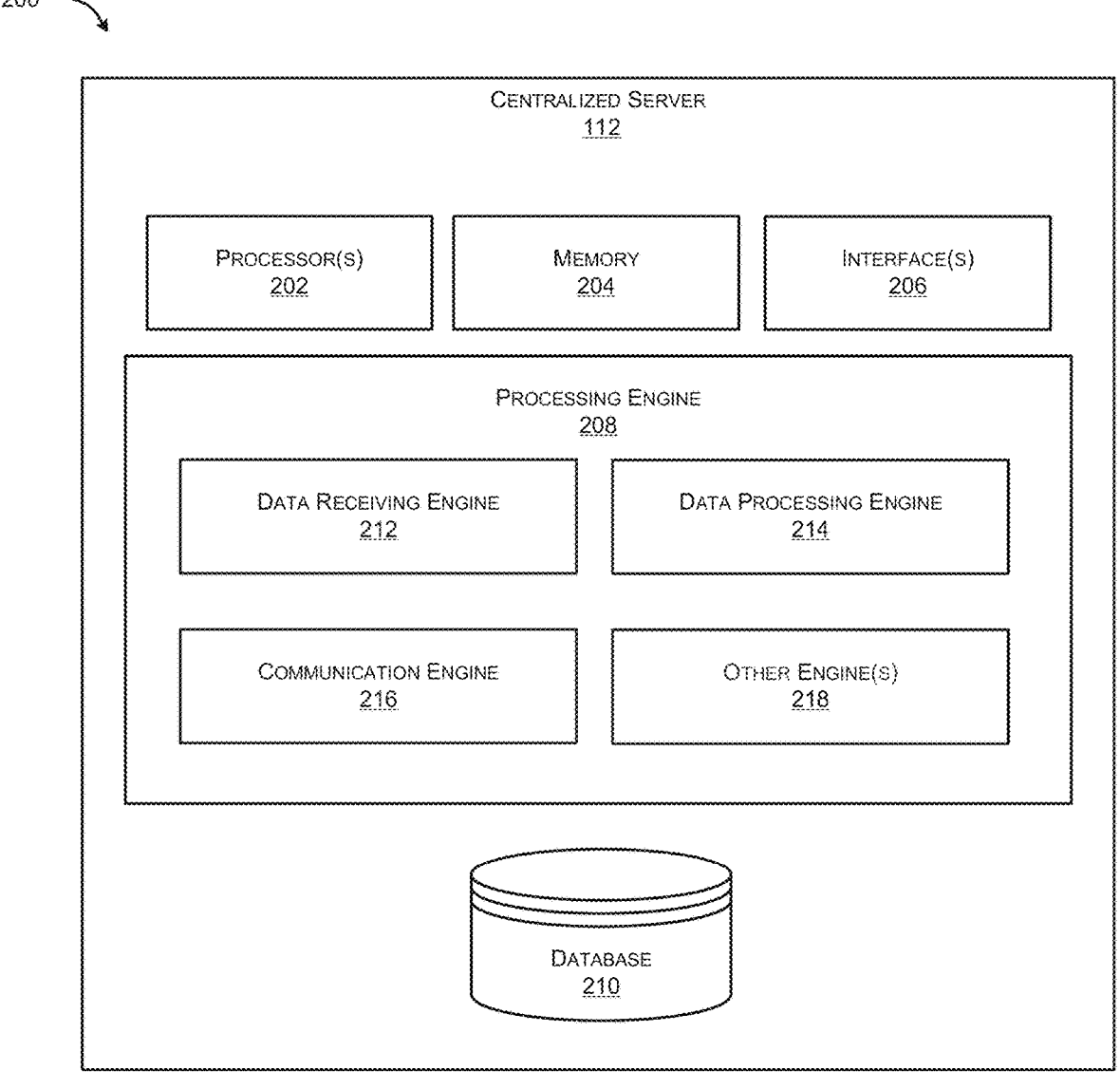
FIG. 2 illustrates an exemplary representation (200) of centralized server (112) of FIG. 1, in accordance with an embodiment of the present disclosure.

In an embodiment, the system (100) for performing secure and contactless fund transfer may include one or more processors coupled with a memory, wherein the memory may store instructions which when executed by the one or more processors may cause the system to perform one or more steps pertaining to the fund transfer. FIG. 2 with reference to FIG. 1, illustrates an exemplary representation of the centralized server (112), in accordance with an embodiment of the present disclosure. In an aspect, the centralized server (112) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (100). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the centralized server (112) may include an interface(s) 206. The interface(s) 206 may comprise a variety of interfaces, for example, interfaces for data input and output devices, referred to as I/O devices, storage devices, and the like. The interface(s) 206 may facilitate communication of the system (100). The interface(s) 206 may also provide a communication pathway for one or more components of the centralized server (112). Examples of such components include, but are not limited to, processing engine(s) 208 and a database 210.

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the centralized server (112) may comprise the machine-readable storage medium storing the instructions and the processing resource to execute the instructions, or the machine-readable storage medium may be separate but accessible to the centralized server (112) and the processing resource. In other examples, the processing engine(s) (208) may be implemented by electronic circuitry.

The processing engine (208) may include one or more engines selected from any of a data receiving engine (212), data processing engine (214), communication engine (216) and other engines (220). In an embodiment, the data receiving engine (212) may enable to receive a data related to the fund transfer such as including, but not limited to, a fund transfer request, details of the transfer, details of the service/product pertaining to the transfer and other such details. In an embodiment, the data processing engine (214) may process the data received by the data receiving engine (212). The communication engine (216) may facilitate communication with one or more service providers pertaining to the fund transfer. In an embodiment, the other engines (220) may include a notification engine, authentication engine and other such engines required to accomplish the fund transfer. The database (210) may comprise data that may be either stored or generated as a result of functionalities implemented by any of the components of the processing engine(s) 208 of the centralized server (112). The database (210) may also enable to store history of fund transfer, user details, entity details and other such details.

Figure 3:
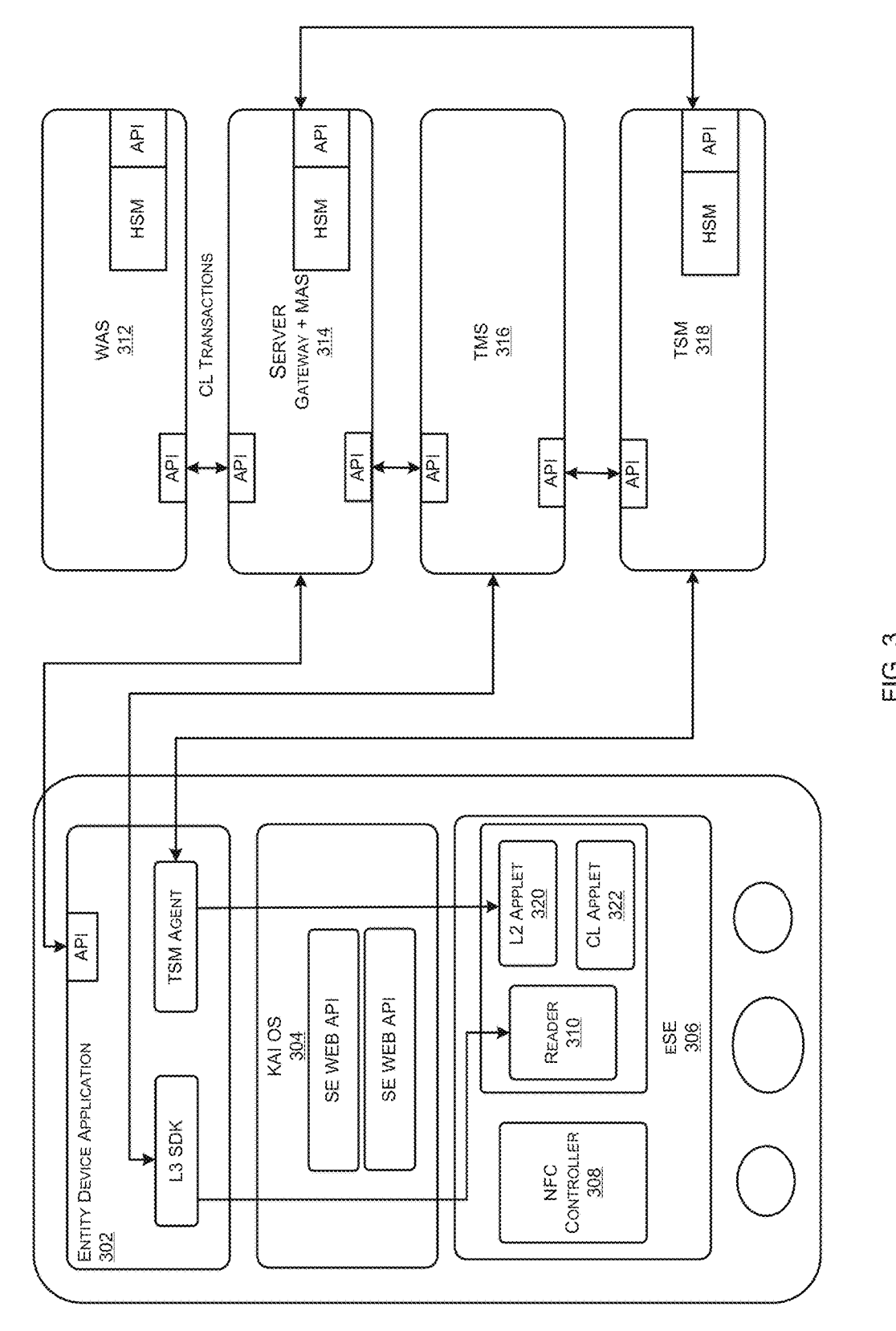
FIG. 3 illustrates an exemplary representation (300) of an entity device and related architecture, in accordance with an embodiment of the present disclosure.

FIG. 3 illustrates an exemplary representation (300) of the entity device and respective components, in accordance with an embodiment of the present disclosure. The entity device (104) may be used by the entity who accepts funds in exchange of a product and/or service as explained hereinabove. The entity device (104) may include an embedded secure element which can be used to facilitate fund transfer using short range communication such as NFC. As illustrated in FIG. 3, the entity device (104) may include a set of instructions in the form of a merchant application (302). In an embodiment, the set of instructions may be a rich user interface (UI) application running on rich operating system (OS) which may provide an interface to the entity to perform one or more actions including, but not limited to, login, fund details, request to initiate a transfer, viewing fund transfer details, request to refund the transfer, receiving notifications and other such actions. Various other actions are also possible to be performed. In an embodiment, the entity device (104) may include operating system such as Kai OS (304). Various other types of operating systems can also be used. In an embodiment, the entity device (104) may include an NFC Controller (308) that may include a chip to manage NFC of the device. Various other types of short-range communication modes/implementations can also be used. In an embodiment, the entity device (104) may include a Reader (310) that may be an applet to read data pertaining to, for example, Open Loop and Closed Loop data. In an embodiment, the entity device (104) may include a L2 Applet (320) that may be a set of instructions to manage logic and cryptographic operations of the fund transfer, wherein the L2 applet (320) may reside inside the embedded secure element. The L2 applet (320) may be considered as a secure payment core, which provides secure contactless terminal capabilities. In an embodiment, the L2 applet (320) may include features such as, for example, point to point encryption, multiple payment scheme support, terminal and kernel configuration and remote management. Various other features may also be included. The L2 applet (320) may reside on a secure environment and may be tightly integrated within an NFC enabled entity device. In an embodiment, the entity device (104) may include a closed loop (CL) applet (322) to perform a closed loop fund transfer.

In an embodiment, the fund transfer may be performed directly by the NFC Controller (308) under control of an applet (320, 322) on the secure element, wherein the step may not necessarily involve text data exchange with host phone operating system or the user computing device. The data/information pertaining to a card of the user may be protected by in the Secure Element by one or more techniques including, but not limited to Triple Data Encryption Standard (3DES) encryption of all sensitive card data, Derived Unique Key Per Transaction (DUKPT), Initial Pin Encryption Key (IPEK) generation and management controlled by Trusted Service Manager (TSM) (318) and other such techniques. Various other implementations can also be used to enhance the security of the system. In an embodiment, the applet (320, 322) on the secure element may facilitate to leverage dedicated cryptographic hardware of the secure environment for fast and secure cryptographic operations. In another embodiment, the applet (320, 322) on the secure element may facilitate to leverage security mechanisms such as, for example, JavaCard™, GlobalPlatform and the like, to protect key material. In an embodiment, the applet (320, 322) on the secure element may be contained in a Global Platform Supplementary Security Domain to restrict access. In an exemplary embodiment, the applet (320, 322) on the secure element may secure over air provisioning and configuration by Global Platform standards that may be not be restricted and several possibilities can be used. In an embodiment, the applet (320, 322) on the secure element may facilitate restricted access to the entity device such that the access may only be given to approved set of instructions or applications by the Global Platform Secure Element Access Control mechanism.

In an embodiment, the secure element (SE) may be tamper-resistant platform, such as, for example, a one chip secure microcontroller, capable of securely hosting set of instructions and corresponding confidential and cryptographic data (for example cryptographic keys) in accordance with plurality of rules and/or security requirements set by well-identified trusted authorities like ANSI, EMVco, PCI. Various other forms of SE may be used including, without limitation, an embedded and integrated SE, a Subscriber Identification Module/universal integrated circuit card (SIM/UICC), a smart micro Secure Digital (SD) cared, smart card or any other cards. The SE may exist in different form factors to address the requirements of different service implementations and market needs.

In an embodiment, the entity device may include, a Hardware Security Module (HSM) that may be employed through a set of instructions that uses digital keys. The HSM may be mainly included to perform one or more actions, including, but not limited to, onboarding secure cryptographic key generation, key management, use of cryptographic and sensitive data material, for example, performing encryption or digital signature functions, securing a full software stack from logical or physical attacks by providing logical and physical separation of sensitive and non-sensitive data, offloading application servers for complete asymmetric and symmetric cryptography, and onboarding secure cryptographic key storage for at least one of the top level or the most sensitive keys such as, for example, master keys. Various other actions may also be performed by the HSM.

In an embodiment, the entity device may include, a trusted service manager (TMS) (316) that may acts as a neutral broker to set up agreements and technical connections with mobile network operators, phone manufacturers or other entities controlling the secure element on the entity device. In an exemplary embodiment, the TSM may be Secure Element Issuer (SEI) TSM. The trusted service manager may enable service providers to distribute and manage their contactless applications remotely by allowing access to the secure element in NFC-enabled entity device (104). In an embodiment, the TSM may be certified for GlobalPlatform Messaging Specification for Management of Mobile NFC Services. The entity device may be associated with server (314) that may enable registration of the entity and forwards fund transfer request from the entity device (104) to the acquirer system. In an embodiment, at the time of fund transfer, a cryptogram generated from entity device (104) may be received by the server (112), validated and forwarded to either the closed loop or open loop network for further processing. In an embodiment, the entity device (104) may be associated with a TMS Server (316) that may be responsible for managing a lifecycle of the Applet (320, 322) on the entity device. The server may request TMS server to install, personalize, block or uninstall the applet (320, 322) on the entity Device. In an embodiment, the entity device (104) may be associated with a Wallet Server (WAS) (312) that is a web-based set of instructions which may take care of closed loop transactions. In an exemplary embodiment, when a fund transfer is performed, the cryptogram generated from entity device may be received by the Server such that the server forwards the cryptogram to WAS in case transaction is a closed loop transaction.

Figure 4A:
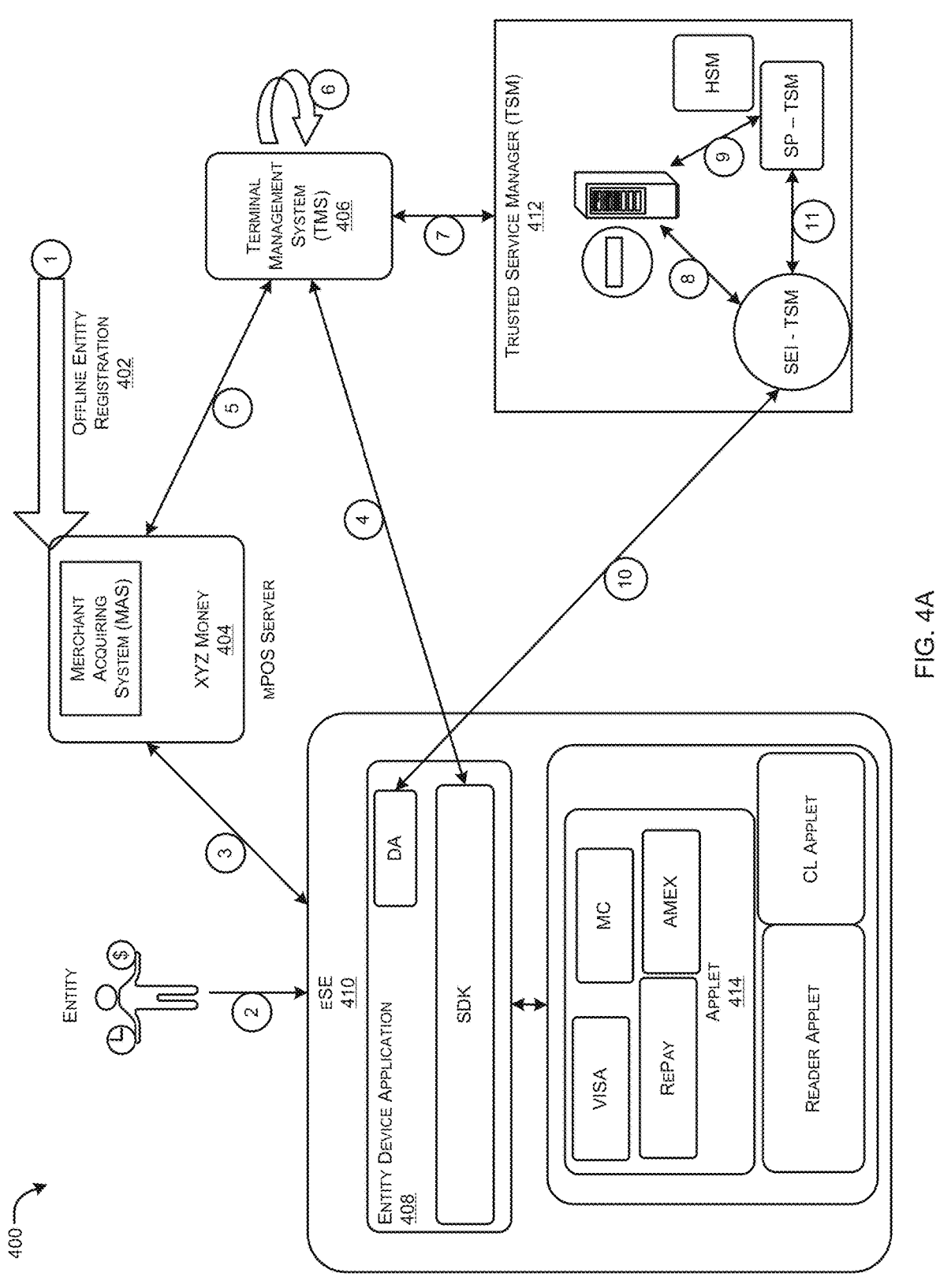
FIG. 4A illustrate exemplary representation (400) of login and on-boarding process, in accordance with an embodiment of the present disclosure.

FIG. 4A illustrate exemplary representation (400) of login and on-boarding process, in accordance with an embodiment of the present disclosure. At step 1 (402), the entity may be registered. In an embodiment, the registration may be performed offline. At step 2, the entity may log in to an interface or set of instructions (application) on the entity device by using valid credentials. In an embodiment, the login credentials may include Login ID (such as entity's mobile number) and password. Various other credentials/authentication means such as based on email ID, one-time password, biometric authentication and other such methods may also be used. At step 3, the entity device application may facilitate sending the login details to a Merchant Acquiring System (MAS). The MAS may check the validity of the merchant by comparing Secure Element Identifier (SEID) against Login ID of the entity, based on which, the MAS may respond with a data or details including, but not limited to, an entity ID or a merchant ID (MID), a terminal ID (TID) and other such information. At step 4, downloadable software package on the entity device (L3SDK) may send a request for provisioning applet on the entity device to TMS (406) with the data including, but not limited to, an entity ID or MID, TID, SEID, IMIE and Device information data and reader status pertaining to the entity device. At step 5, the TMS (406) may send the data (MID, TID, etc) to MAS, such that the MAS responds with entity data. At step 6, the TMS (406) may send a response to L3SDK, wherein the response may indicate that the initialization is in progress. At step 7, the TMS (406) may query the entity data from the MAS and the Server may send a deploy service request to TMS with key parameters. At step 8, the TMS (406) may send the deploy service request to Windows Embedded Standard (WES) (part of device enrolment program DEP) with key parameters from MAS applet. At step 9, SEI TSM may forward the request to WES. At step 10, SEI-TSM may create Security Domain (SD) on the eSE (410). In an embodiment, if the step is successful then, the Device Agent (DA) may send an acknowledgement back to SEI-TSM. At step 11, a SD key may be exchanged between SEI-TSM and SP-TSM.

Figure 4B:
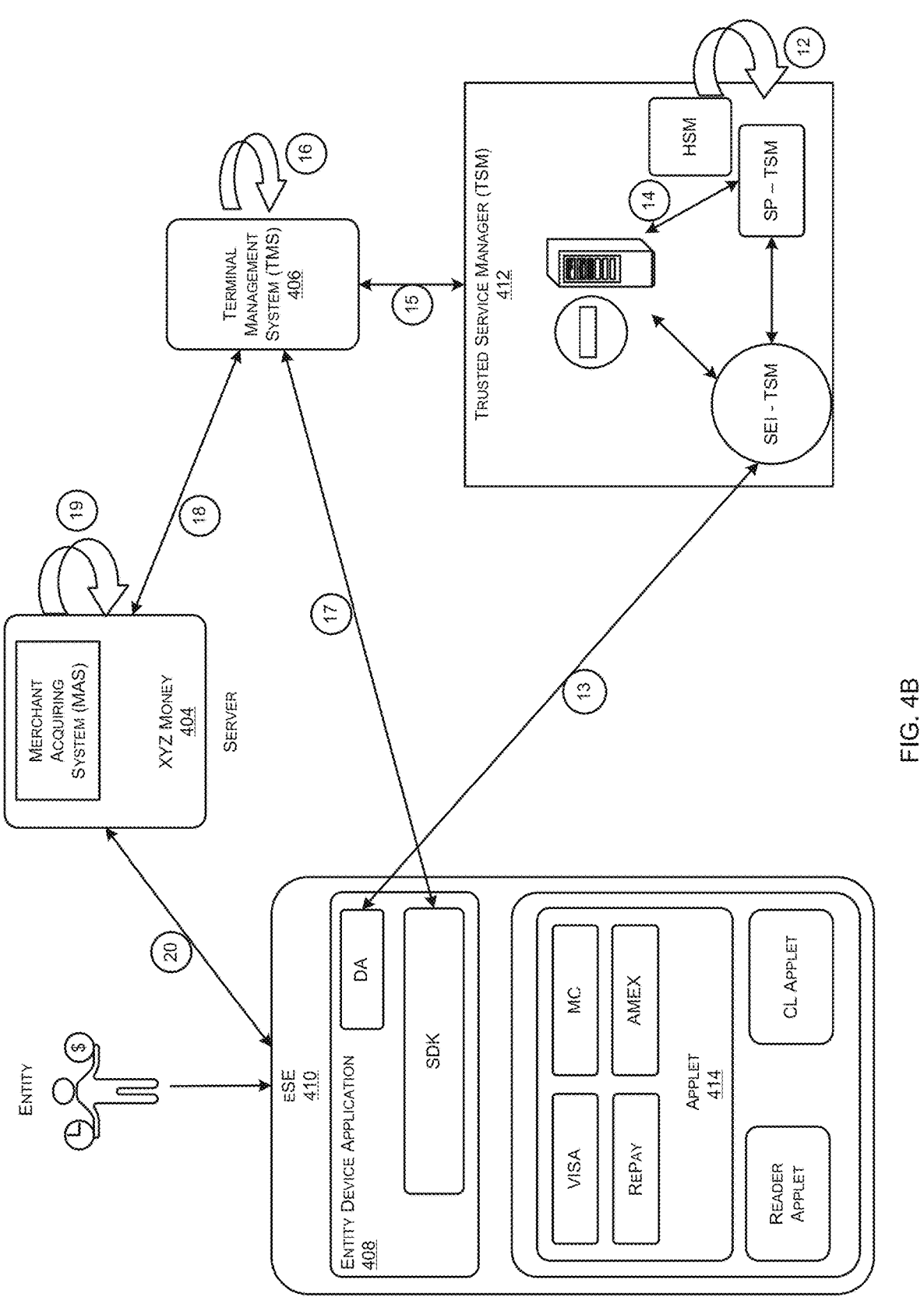
FIG. 4B illustrates an exemplary representation (450) of login and on-boarding process in continuation to the steps depicted in FIG. 4A, in accordance with an embodiment of the present disclosure.

FIG. 4B illustrates an exemplary representation (450) of login and on-boarding process in continuation to the steps depicted in FIG. 4A, in accordance with an embodiment of the present disclosure. At step 12, SP-TSM may perform a task including, but not limited to, preparing installation scripts such as but not limited to Personalisation Script based on inputs from TMS, generating Initial Pin Encryption Key (IPEK) Keys and initial Key Serial Number (KSN) and generate KTMS. At step 13, SP-TSM may use push notification service to push personalized applet to eSE (410). The installation may be personalized with IPEK Keys and EMV configuration, such that if successful then, DA may send an acknowledgement back to SP-TSM. At step 14, SP-TSM may forward the acknowledgement to WES. At step 15, the WES (part of DEP) may send an acknowledgement back to TMS (406). At step 16, the TMS (406) may update the Database, and pull-out merchant specific personalization parameters for applet (aka EMV Contactless Kernel) based on Merchant Category. At step 17, the TMS (406) may send L2 Personalization parameters to L3SDK based on Merchant Category. At step 18, TMS (406) may send an acknowledgement to the Server. At step 19, the Server may create a database of device binding—SEID and Merchant Mobile Number (Merchant Login ID). At step 20, the Server may send an acknowledgement back to the entity device application 408 indicating the completion of provisioning phase.

Figure 5:
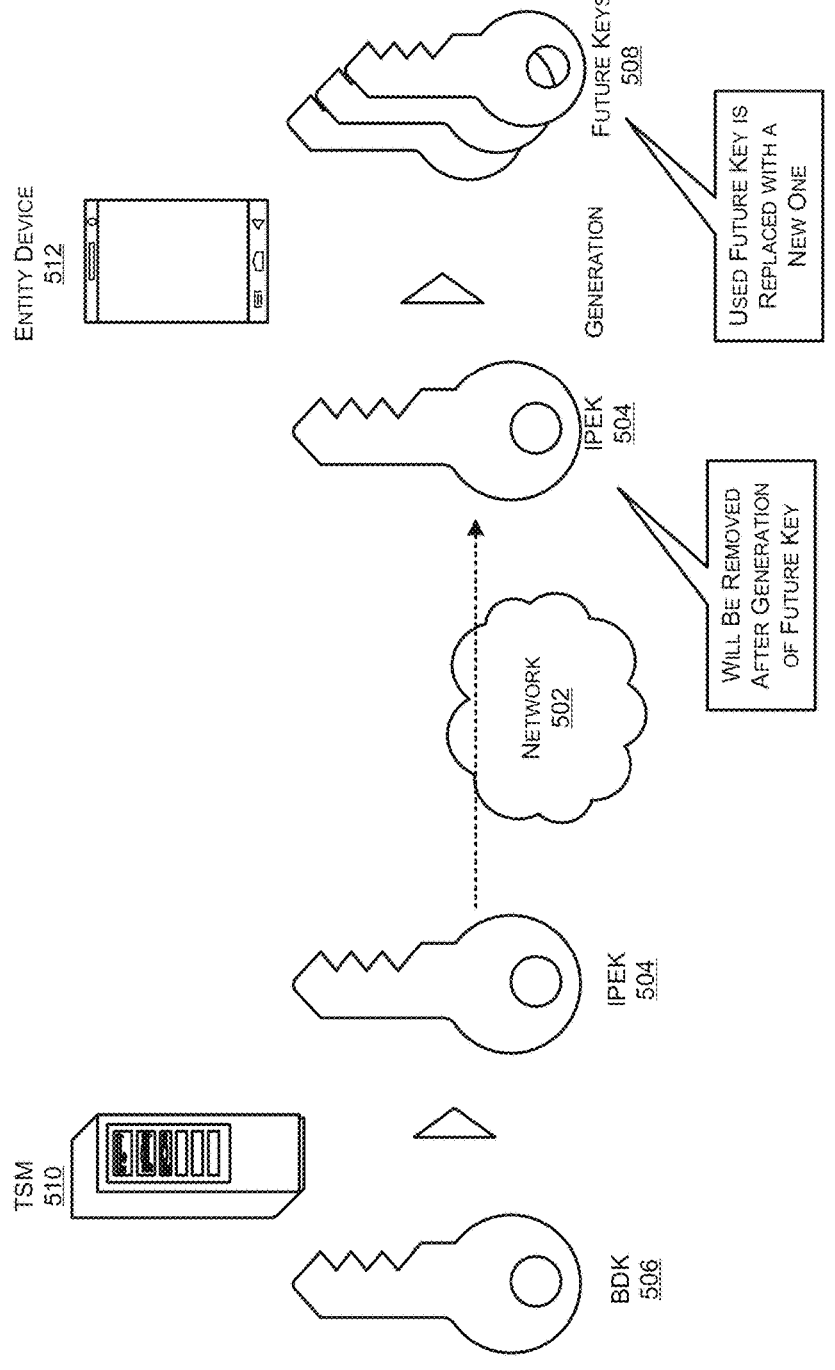
FIG. 5 illustrates an exemplary representation (500) for key management through Derived Unique Key Per Transaction (DUKPT), in accordance with an embodiment of the present disclosure.

FIG. 5 illustrates an exemplary representation (500) for key management through Derived Unique Key Per Transaction (DUKPT), in accordance with an embodiment of the present disclosure. The DUKPT process enables safeguarding cardholder or card information pertaining to the user by encryption key generation i.e. DUKPT. This facilitates generation of a new non-reusable key for every fund transfer such that the new key does not lead to original base key. As illustrated in FIG. 5, the TSM (510) enables generation of Base Derivation Key (BDK) (506) that may be used to initiate the DUKPT process. Using the BDK (506), another key called as the IPEK (504) (Initial Pin Encryption Key) may be generated. The IPEK (504) is transmitted to the entity device (512) such that using the IPEK (504), a future key (508) is generated. In an embodiment, 21 future keys may be generated. The IPEK (504) may be removed from the entity device (512) after generation of the future key (508) and hence it is impossible to trace back to BDK (506) using the future key (508). In an embodiment, for every transaction a used future key may be replaced with a new future key.

Figure 6:
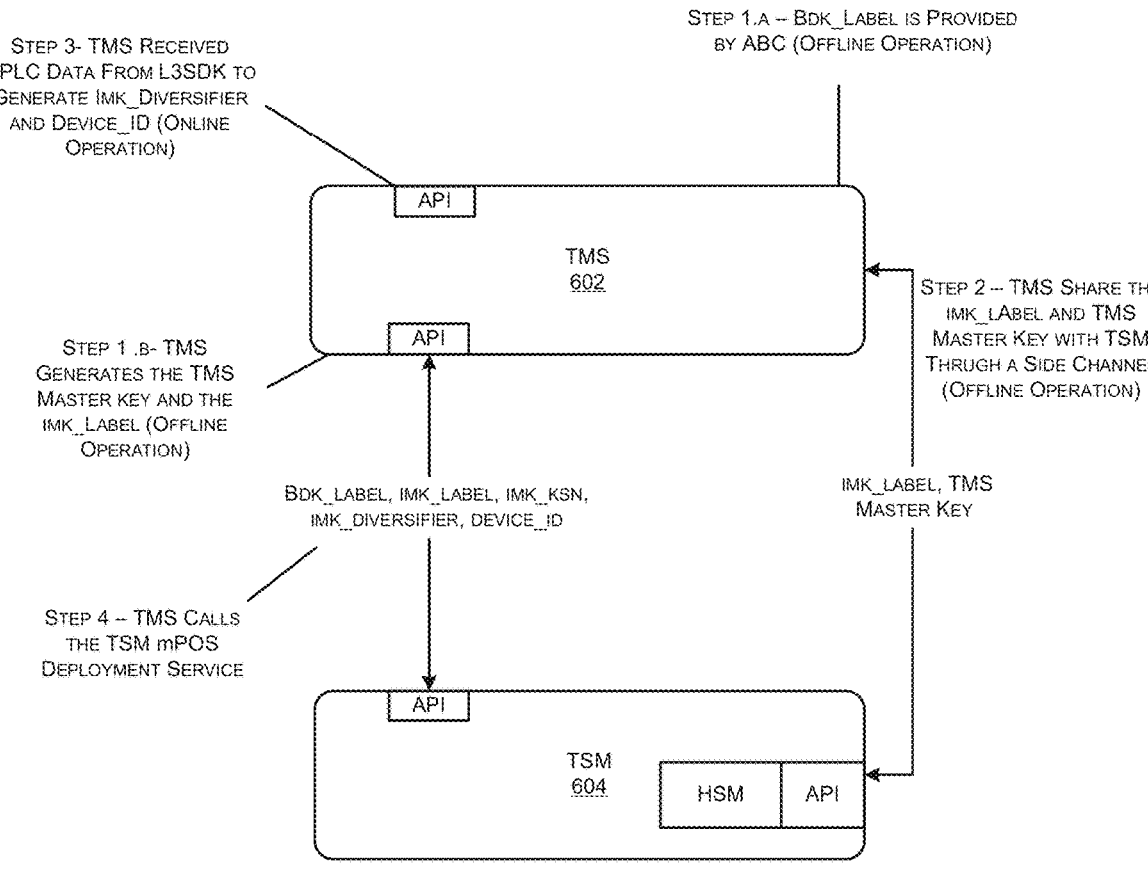
FIG. 6 illustrates an exemplary representation (600) depicting a key sharing process, in accordance with an embodiment of the present disclosure.

FIG. 6 illustrates an exemplary representation (600) depicting a key sharing process, in accordance with an embodiment of the present disclosure. At step 1a, BDK label may be provided by ABC (offline operation). At step 1b, TMS (602) may generate a TMS master key and Issuer Master Key (IMK) label (offline operation). At step 2, TMS (602) may share the IMK label and TMS master key with TSM (604) through a side channel (offline operation). At step 3, TMS (602) may receive CPLC data from SDK to generate IMK diversifier and device ID (online operation). At step 4, TMS (602) may call the TSM deployment service for fund acceptance from the user.

Figure 7A:
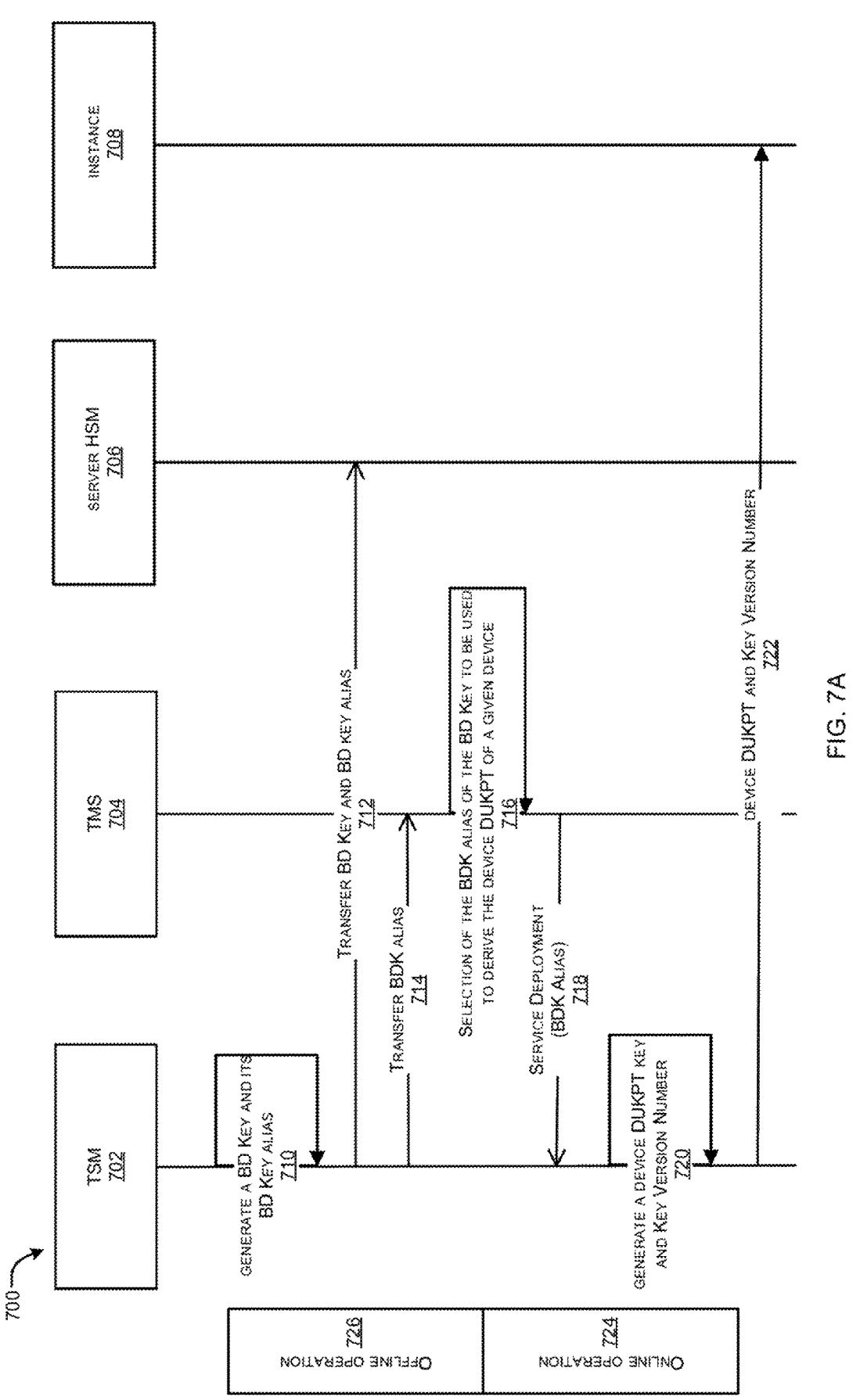
FIG. 7A illustrates an exemplary representation (700) for DUKPT key deployment, in accordance with an embodiment of the present disclosure.

FIG. 7A illustrates an exemplary representation (800) for DUKPT key deployment, in accordance with an embodiment of the present disclosure. As illustrated in FIG. 7A, the interaction between TMS (704), TSM (702), HSM server (706). At 710, a BD key and its BD key alias may be generated. At 712, the BD key and BD key alias may be transferred. At 714, the BDK alias may be transferred. At 716, selection of the BDK alias of the BD key may be performed for deriving the device DUKPT of a given device. At 718, service deployment (BDK alias) may be done. At 720, a device DUKPT key and key version number may be generated. At 722, the device DUKPT and version number may be shared.

Figure 7B:
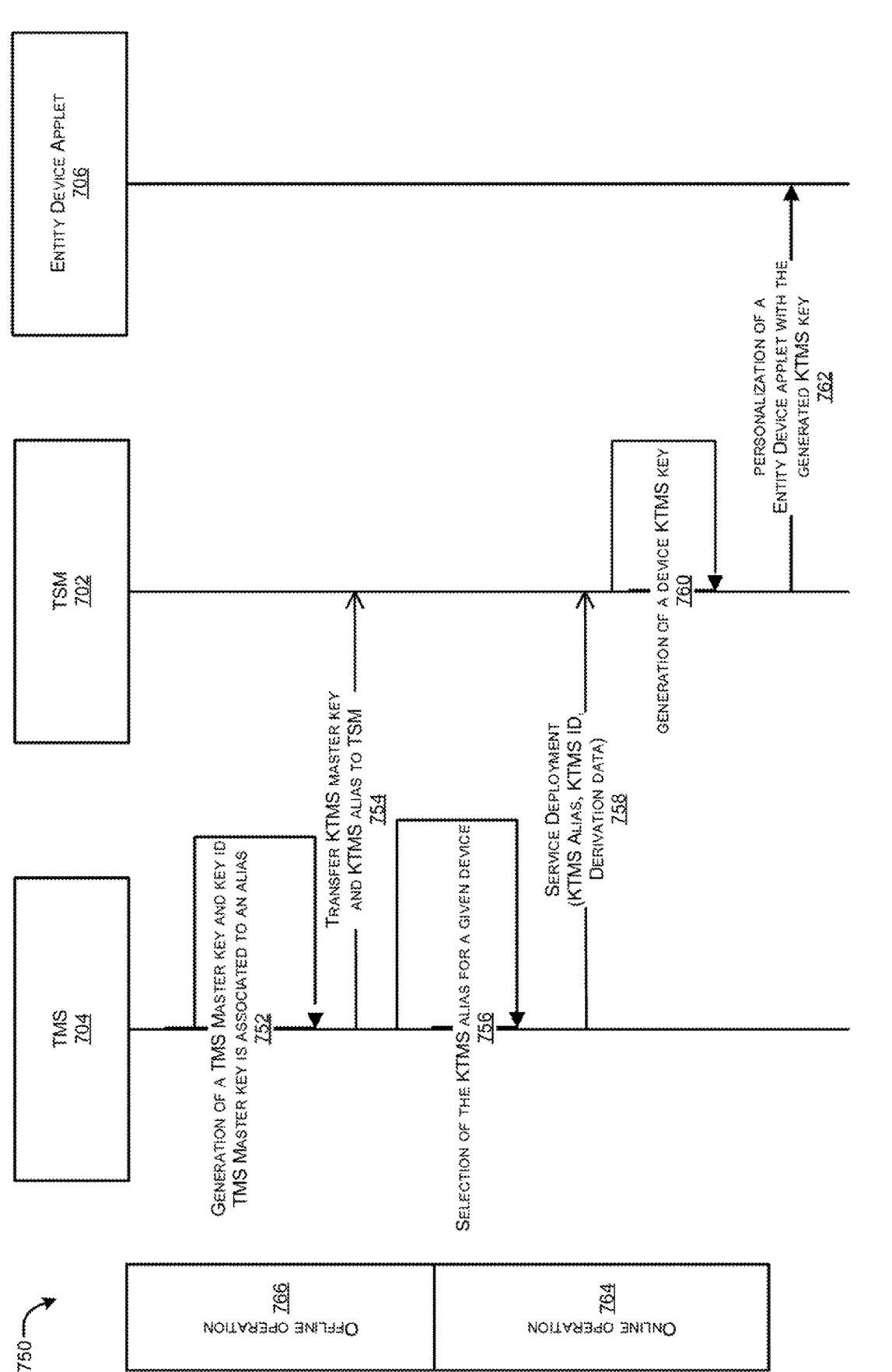
FIG. 7B illustrates an exemplary representation (750) for KTMS key deployment, in accordance with an embodiment of the present disclosure.

FIG. 7B illustrates an exemplary representation (750) for KTMS key deployment, in accordance with an embodiment of the present disclosure. As illustrated in FIG. 7B, the interaction between TMS (704), TSM (702), entity device applet (706) in offline and online operation is depicted. At 752, generation of a TMS master key and key ID may occur in an offline operation. The TMS master key may be associated to an alias. At 754, the KTMS master key and KTMS alias may be transferred to the TSM (702). At 756, selection of the KTMS alias for a given entity device may occur. At 758, in an online operation (722), service deployment may occur involving implementation of KTMS alias, KTMS ID, derivation data. At 760, generation of device KTMS key may occur in an online operation at TSM (704). At 762, personalization of entity device applet with the generated KTMS key may take place in an online operation.

Figure 8:
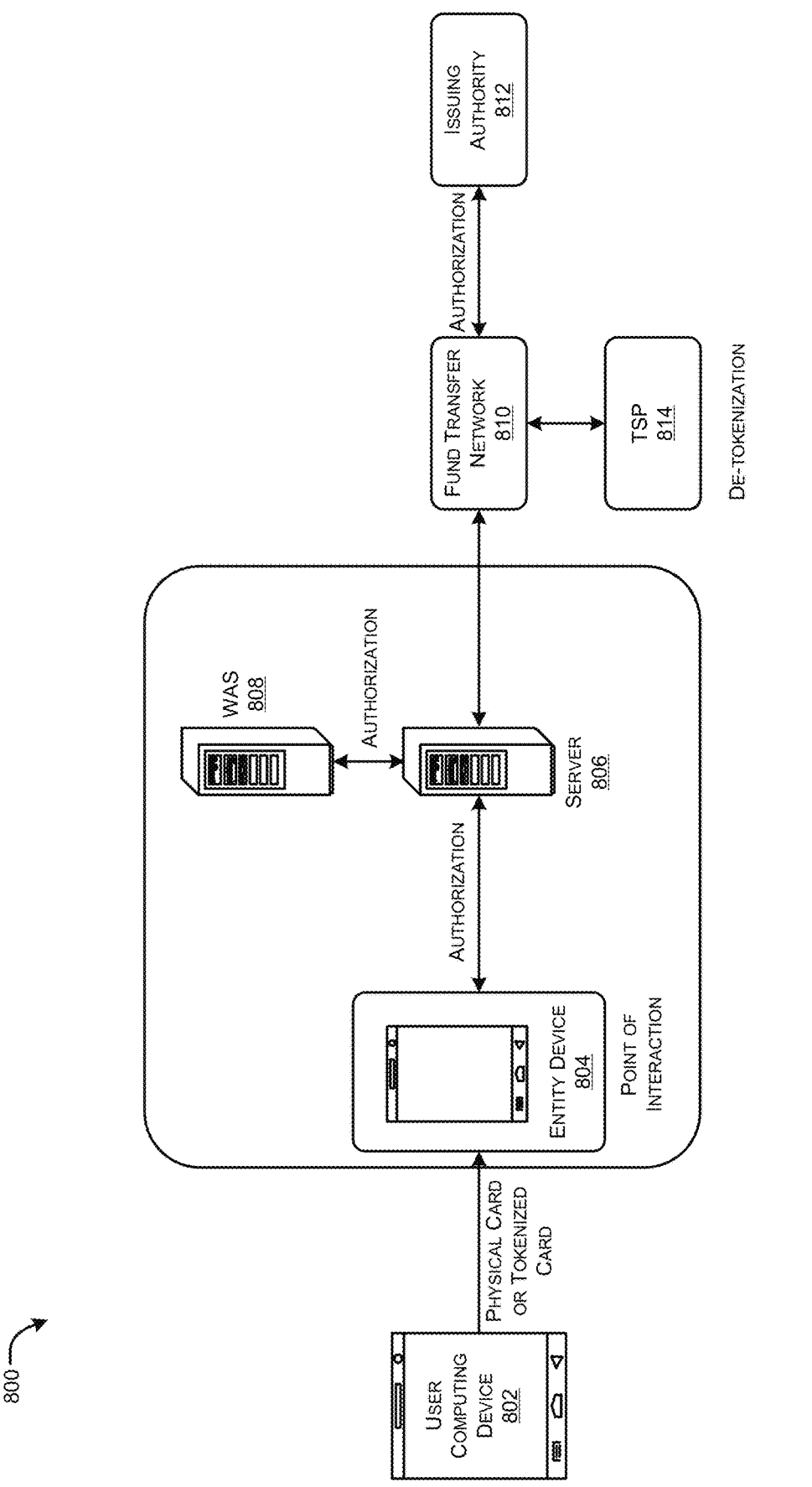
FIG. 8 illustrates an exemplary representation (800) showing an overall view of fund transfer process, in accordance with an embodiment of the present disclosure.

FIG. 8 illustrates an exemplary representation (800) showing an overall view of fund transfer process, in accordance with an embodiment of the present disclosure. The overall fund transfer process may include physical or tokenized card data accessible on an entity device 804 through a user computing device 802. The card data may be encrypted by DUKPT key, that may be derived from BDK as explained in the previous figures). The encrypted data, key serial number (KSN) and entity related data will be sent to MAS server (806). The MAS Server (806) may check whether the transaction is open loop or closed loop basis and the transaction type returned from kernel. In an exemplary embodiment, the type of fund transfer may be EMV Open Loop transaction, wherein the process may involve a step of obtaining, at the MAS server (806), data pertaining to BDK alias, KSN details for the entity/device ID, wherein HSM at MAS server may decrypt the encrypted data using KSN and IPEK (Derived from BDK). The decrypted data may be sent to Payment Network in Authorization request. A payment network (810) may de-tokenize the data at the Token Service Provider (TSP) (814) and process it further for final authorization by the issuing authority (812) including, for example, a bank. In another exemplary embodiment, the type of fund transfer may be Closed Loop transaction, wherein the process may involve a step of forwarding, at the MAS server (806), the cryptogram to WAS server (808). The WAS server (808) may decrypt the cryptogram using closed loop session transaction key. The WAS server (808) may settle the transaction between entity and user.

Figure 9:
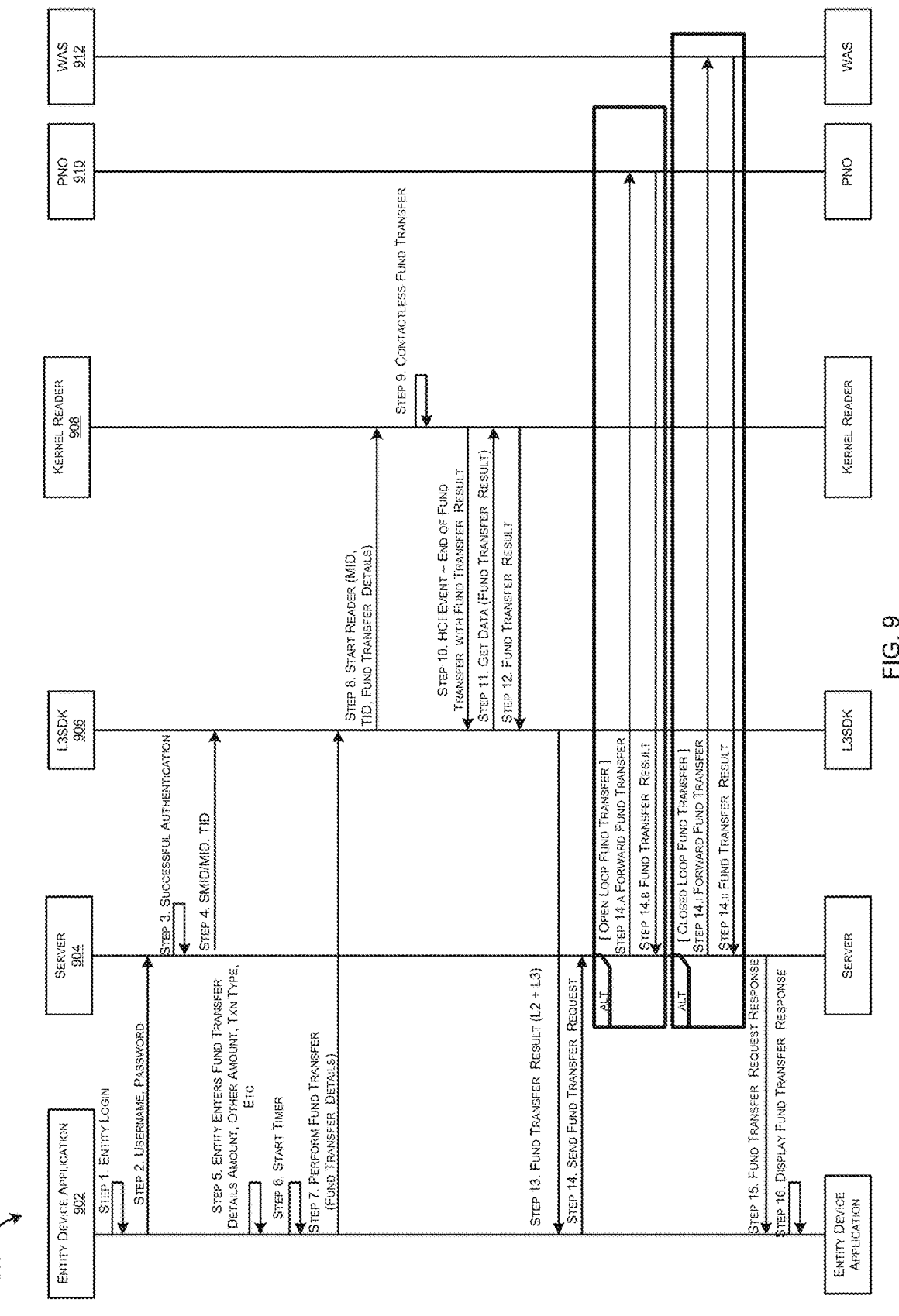
FIG. 9 illustrates an exemplary representation (900) showing an overall view of fund transfer process in an open loop or closed loop system, in accordance with an embodiment of the present disclosure.

FIG. 9 illustrates an exemplary representation (900) showing an overall view of fund transfer process in an open loop system, in accordance with an embodiment of the present disclosure. The fund transfer may involve an entity device bearing an entity device application (902), a server (904) and L3SDK (906). At step 1, the entity may login using the entity device application (902). At step 2, the entity device application (902) may validate the entity username and password. At step 3, an authentication may be performed on the Server 904 (MAS Server). At step 4, upon successful authentication, entity ID (also called as merchant ID or MID), TID, and other such details may be returned to the Merchant app which forwards to L3SDK (906). At step 5, the entity may enter fund transfer details like amount, another amount and the like. At step 6, the entity device application (902) may initiate a timer for fund transfer or transaction timeout. At step 7, the entity device application (902) may send a request to perform transaction to card reader. At step 8, L3SDK may start the Reader to accept or prepare for contactless fund transfer. At step 9, the user may tap the user card (physical card) or card (tokenised) in user computing device on the entity device. The contactless fund transfer may be performed according to EMVCo contactless transactions for Open Loop/transit, Mifare for transit/loyalty or Closed Loop proprietary contactless transaction, or other such transactions. At step 10, once the transaction is completed, a HCl event is generated with the transaction result and data. At step 11, L3SDK fetches the transaction data from the Secure Element. At step 12, Reader may return transaction data to L3SDK. At step 12, L3SDK may pass the data to Merchant app. At step 13, depending on Offline/online fund transfer, the entity/entity device may transfer the data to Server, which can be immediately for online transactions or later for offline transactions. At step 14*a*, if an open loop fund transfer is involved, the server forwards the request to payment network and the transaction result may be returned to Server at step 14*b*. In case of closed loop fund transfer, the server may forward the request to Wallet Server at Step 14*i* and the transaction result is returned to mPOS Server at step 14*ii*. At step 15, the response of the transaction in case of online transactions may be fetched from the server. At step 16, the transaction response may be displayed to the entity.

Figure 10:
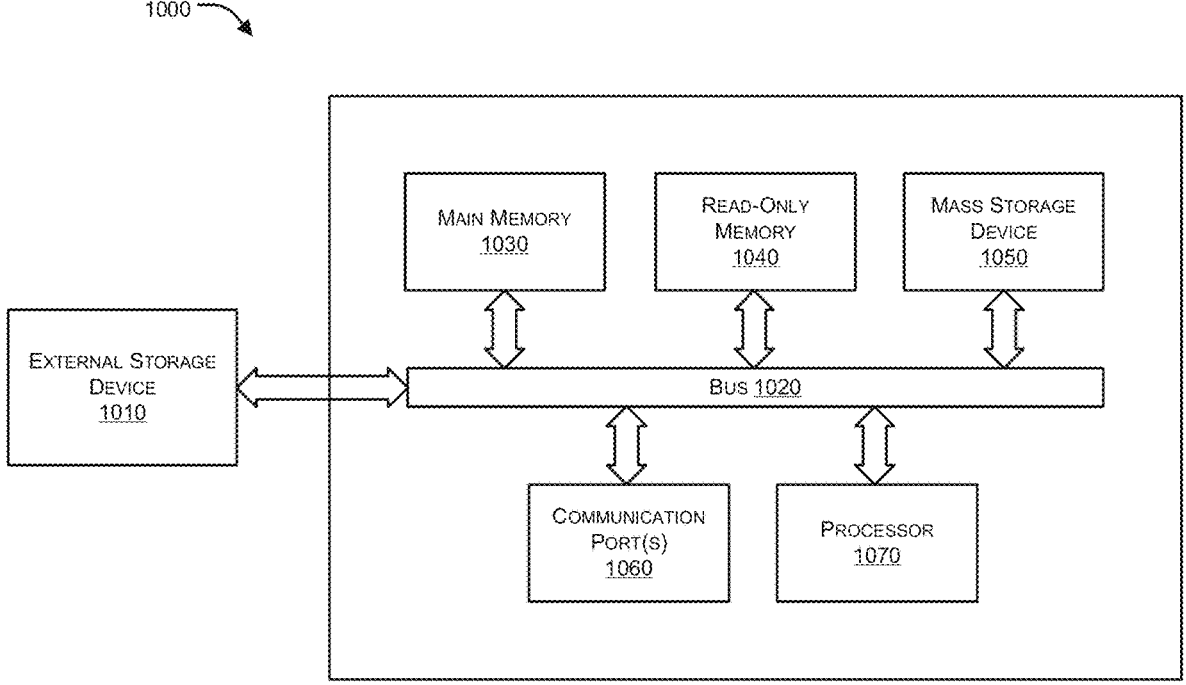
FIG. 10 refers to the exemplary computer system (1000) in which or with which embodiments of the present invention can be utilized, in accordance with embodiments of the present disclosure.

FIG. 10 refers to the exemplary computer system (1000) in which or with which embodiments of the present invention can be utilized, in accordance with embodiments of the present disclosure. As shown in FIG. 10, a computer system 1000 can include an external storage device 1010, a bus 1020, a main memory 1030, a read only memory 1040, a mass storage device 1050, communication port 1060, and a processor 1070. A person skilled in the art will appreciate that the computer system may include more than one processor and communication ports. Examples of processor 1070 include, but are not limited to, an Intel® Itanium® or Itanium 2 processor(s), or AMD® Opteron® or Athlon MP® processor(s), Motorola® lines of processors, Forti-SOC™ system on chip processors or other future processors. Processor 1070 may include various modules associated with embodiments of the present invention. Communication port 1060 can be any of an RS-232 port for use with a modem-based dialup connection, a 10/100 Ethernet port, a Gigabit or 10 Gigabit port using copper or fiber, a serial port, a parallel port, or other existing or future ports. Communication port 1060 may be chosen depending on a network, such a Local Area Network (LAN), Wide Area Network (WAN), or any network to which computer system connects. Memory 1030 can be Random Access Memory (RAM), or any other dynamic storage device commonly known in the art. Read-only memory 1040 can be any static storage device(s) e.g., but not limited to, a Programmable Read Only Memory (PROM) chips for storing static information e.g., start-up or BIOS instructions for processor 1070. Mass storage 1050 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7102 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 1020 communicatively couples processor(s) 1070 with the other memory, storage and communication blocks. Bus 1020 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1070 to software system.

Optionally, operator and administrative interfaces, e.g. a display, keyboard, and a cursor control device, may also be coupled to bus 1020 to support direct operator interaction with a computer system. Other operator and administrative interfaces can be provided through network connections connected through communication port 1060. The external storage device 1010 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the afore-mentioned exemplary computer system limit the scope of the present disclosure.

Thus, the present disclosure provides a unique and inventive solution for performing fund transfer. The entity device of the present disclosure provides portability of device capable of communication over short range communication with user devices/physical cards to enable fund transfer from the user to the entity in a cost-effective and contactless manner, unlike the conventional point-of-sale (POS) systems. The system and method of the present invention can enable an entity or fund recipient to operate without complicated devices, and in a faster, consistent and reliable operation that does not require bulky/expensive POS implementations and/or physical reading of cards and hence is devoid of the disadvantages associated thereto.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

Advantages of the Present Disclosure

The present disclosure provides for a system and a method for performing secure, reliable and contactless fund transfer.

The present disclosure provides for a system and a method for reducing the costs of complex physical implementation involved in conventional systems.

The present disclosure provides for a system and a method for performing offline fund transfer.

The present disclosure provides for a system and a method for performing secure and contactless fund transfer in open loop systems and closed loop systems.

We claim:

1. A system for managing contactless e-transactions from a user to an entity by facilitating a unique communication channel between an external user computing device and an entity device, the system comprising:
   one or more processors coupled with a memory, said one or more processors comprising:
   a secure element embedded within the entity device such that the secure element enables a short-range communication with the external user computing device, wherein a hardware security module (HSM) is coupled to the secure element;
   wherein said memory stores instructions which, when executed by the one or more processors, causes the system to:
   receive, by the secure element at the entity device, a set of data packets from the external user computing device pertaining to one or more services to be availed by the user;
   extract, by the secure element, a first set of features from the received set of data packets, wherein the received set of data packets is updated in the secure element every time a new external user computing device tries to establish communication with the entity device;
   verify, by the secure element, an authenticity of the user based on mapping said extracted first set of features with a knowledgeable database having information and registration details of said user;
   upon establishing authenticity, initiate, by the secure element, a communication channel to generate a secure and confidential transaction module between the secure element and the external user computing device, wherein the transaction module is a function executed within the secure element, wherein the communication channel is established when the physical distance between the entity device and the external user computing device is within a range of 1 cm to 10 cm; and
   transfer, with the help of the transaction module, funds with respect to the one or more services, the funds being transferred from the external user computing device to the secure element embedded in the entity device, wherein the funds transfer corresponds to a closed loop fund transfer that is processed through a wallet server associated with the entity device, said closed loop fund transfer being performed by a closed loop applet that resides inside the secure element such that said closed loop applet is managed by a trusted service manager (TSM) by creating a security domain on said secure element, wherein, during the closed loop fund transfer, a cryptogram generated by the entity device is transmitted to a server associated with the entity device, the server being configured to forward the cryptogram to the wallet server (WAS), and wherein to transfer the funds through the initiated secure communication channel, the secure element is configured to:
   generate a future key for each transaction of the funds based on an initial pin encryption key; and
   remove the initial pin encryption key upon the generation of the future key to enable safeguarding of the information of the user.

2. The system as claimed in claim 1, wherein the system is configured to obtain a registration data based on a request from an unregistered user through respective external user computing device, wherein login credentials are generated based on acknowledgement of the request and verification of the registration data, and wherein the user enters the generated login credentials to access the system to obtain the one or more services provided by the entity.

3. The system as claimed in claim 1, further comprising a digital engagement module operatively coupled to the transaction module and includes one or more operations of fund transaction pertaining to any of a tap-to-x transaction model, a tap-to-pay for fund transaction, and a tap-to-go for transit/access or a combination thereof.

4. The system as claimed in claim 3, wherein each operation pertaining to the one or more operations of fund transaction processed through the secure element is a contactless exchange with the entity device.

5. The system as claimed in claim 4, wherein at least one operation pertaining to the fund transaction involve contactless use of a user card or one or more coupons.

6. The system as claimed in claim 1, wherein fund transaction is facilitated in a secure manner by a predefined encryption process, and wherein the closed loop-based transaction is defined/supported by one or more standard modes.

7. The system as claimed in claim 1, wherein the Hardware Security Module (HSM) is configured to: onboard a secure cryptographic key generation for fund transaction; onboard storage for the secure cryptographic key, at least for a top level and most sensitive keys; manage the secure cryptographic key; use the secure cryptographic key, for performing encryption or digital signature functions; offload one or more servers for complete asymmetric and symmetric cryptography; and secure a knowledgebase from any logical or physical attacks.

8. The system as claimed in claim 1, further comprising a Near-field communication (NFC) controller, operatively coupled to the external user computing device and the entity device, and wherein the NFC controller enables the short-range communication that is secure and confidential between the external user computing device and the entity device.

9. The system as claimed in claim 1, wherein the TSM provisions the closed loop applet into the secure element in response to a provisioning request sent by said entity device, said request comprising an entity identifier, a secure element identifier, and status of reader configured in said entity device.

10. The system as claimed in claim 1, wherein a terminal management system (TMS) generates a TMS master key along with an issuer master key (IMK), and share said TMS master key along with the issuer master key (IMK) with the TSM, based on which said closed loop applet is managed by the TSM by creating said security domain on said secure element.

11. A method for managing contactless e-transactions from a user to an entity by facilitating a unique communication channel between an external user computing device and an entity device, the method comprising:

receiving, by a secure element embedded within the entity device, a set of data packets from the external user computing device pertaining to one or more services to be availed by the user, wherein the secure element enables a short range communication with the external user computing device, and wherein a hardware security module (HSM) is coupled to the secure element;

extracting, by the secure element; a first set of features from the received set of data packets, wherein the set of data packets is updated in the secure element every time a new external user computing device tries to establish communication with the entity device;

verifying, by the secure element, an authenticity of the user based on mapping said extracted first set of features with a knowledgeable database having information and registration details of said user;

upon establishing authenticity, initiating, by the secure element, a communication channel to generate a secure and confidential transaction module between the secure element and the external user computing device, wherein the communication channel is established when the physical distance between the entity device and the external user computing device is within a range of 1 cm to 10 cm; and transferring with the help of the transaction module, through the initiated secure communication channel, funds with respect to the one or more services, the funds being transferred from the external user computing device to the secure element embedded within the entity device, wherein the funds transfer corresponds to a closed loop fund transfer that is processed through a wallet server associated with the entity device, said closed loop fund transfer being performed by a closed loop applet that resides inside the secure element such that said closed loop applet is managed by a trusted service manager (TSM) server by creating a security domain on said secure element, wherein, during the closed loop fund transfer, a cryptogram generated by the entity device is transmitted to a server associated with the entity device, the server being configured to forward the cryptogram to the wallet server (WAS), and wherein the transferring comprises:

generating a future key for each transaction of the funds based on an initial pin encryption key; and removing the initial pin encryption key upon the generation of the future key to safeguard the information of the user.

12. The method as claimed in claim 11, wherein the method further comprises: obtaining a registration data based on a request from an unregistered user through respective external user computing device, wherein login credentials are generated based on acknowledgement of the request and verification of the registration data, and wherein the user enters the generated login credentials to access the method to obtain the one or more services provided by the entity.

13. The method as claimed in claim 11, further comprising a digital engagement module operatively coupled to the transaction module includes one or more operations of fund transaction pertaining to any of a tap-to-x transaction model, a tap-to-pay for fund transaction, and a tap-to-go for transit/access or a combination thereof.

14. The method as claimed in claim 13, wherein each operation pertaining to the one or more operations of fund transaction processed through the secure element is a contactless exchange with the entity device.

15. The method as claimed in claim 14, wherein at least one operation pertaining to the fund transaction involve contactless use of a user card or one or more coupons.

16. The method as claimed in claim 11, wherein fund transaction is facilitated in a secure manner by a predefined encryption process, and wherein the closed loop based transaction is defined/supported by one or more standard modes.

17. The method as claimed in claim 11, wherein the method, via the Hardware Security Module (HSM), comprises: onboarding a secure cryptographic key generation for fund transaction; onboarding storage of the secure cryptographic key, at least for a top level and most sensitive keys; managing the secure cryptographic key; using the secure cryptographic key, for performing encryption or digital signature functions; offloading one or more servers for complete asymmetric and symmetric cryptography; and securing a knowledgebase from any logical or physical attacks.

18. The method as claimed in claim 11, further comprising a Near-field communication (NFC) controller, operatively coupled to the external user computing device and the entity device, wherein the NFC controller enables the short-range communication that is secure and confidential between the external user computing device and the entity device.

19. The method as claimed in claim 11, wherein the TSM provisions the closed loop applet into the secure element in response to a provisioning request sent by said entity device, said request comprising an entity identifier, a secure element identifier, and status of reader configured in said entity device.

\* \* \* \* \*